May 26, 1925.					1,539,284
J. E. THEBAUD
FUMIGATING DEVICE
Filed Feb. 14, 1921
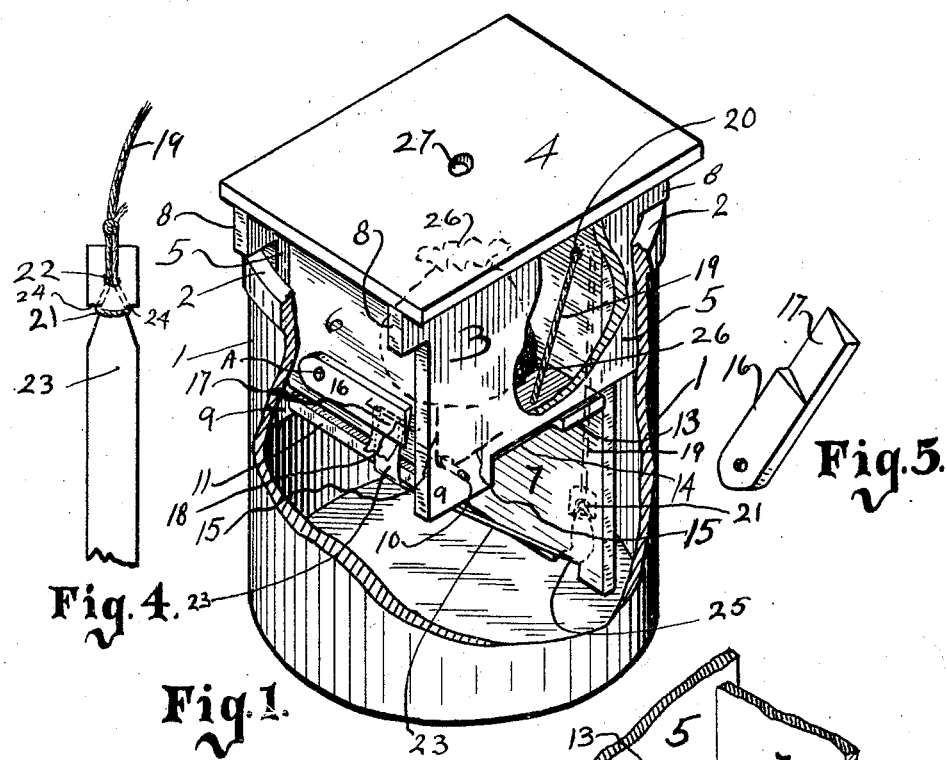
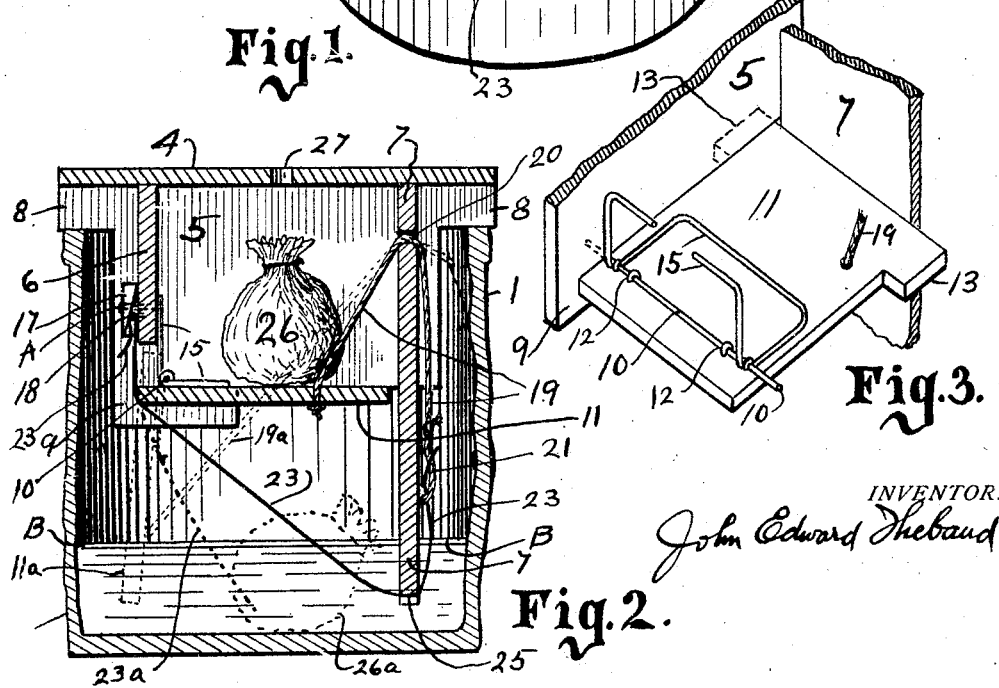
INVENTOR.
John Edward Thebaud

Patented May 26, 1925.

1,539,284

UNITED STATES PATENT OFFICE.

JOHN EDWARD THEBAUD, OF PHILADELPHIA, PENNSYLVANIA.

FUMIGATING DEVICE.

Application filed February 14, 1921. Serial No. 444,876.

*To all whom it may concern:*

Be it known that I, JOHN EDWARD THEBAUD, a citizen of the United States, and a resident of Philadelphia, in the county of Philadelphia, Pennsylvania, have invented certain new and useful Improvements in Fumigating Devices, of which the following is a specification.

This invention relates to fumigating devices, particularly those designed to act automatically at a predetermined time.

One of the objects of this invention is to provide simple and reliable means for permitting chemical substances to come together for a re-action particularly to produce a gas, after the operator has had sufficient time to escape to a place of safety.

Another object is to provide means for automatically releasing one chemical substance to fall on another for producing a gas by their union at some time subsequent to setting the device for the operation.

Another object of this invention is to provide a device adapted to cause two chemical substances, held thereby, to automatically come together for a re-action after a lapse of time, subsequent to that of setting the device for action, the device being adapted for keeping the said substances apart for the length of time desired.

A further object is to provide an inexpensive gas fumigating device which is governed in time of operation by the length of time it takes for one of its elements to be weakened and have its strength destroyed, when put into contact with one of the chemical substances, used in producing the gas.

A further object is to provide an automatically operated fumigating device, which is independent of any clock or other mechanically timed mechanism, which is liable to fail at times.

With these and other objects, my invention resides in certain construction, one embodiment of which is illustrated in the accompanying drawings, is hereinafter described, its functions and operation are explained, and what I claim is set forth.

In the drawings,

Figure 1 is a perspective view of one form of my invention having parts broken away to illustrate its internal construction.

Figure 2 is a sectional elevation of the device shown in Figure 1, showing in dotted line position, that taken by the parts, when released for bringing the chemical substances together to produce the fumigating gas.

Figure 3 is a fragmentary perspective view, illustrating the holding, or set position of the drop door for supporting one chemical substance above another, until it is desired to have them come together to produce the gas for fumigation.

Figure 4 is an elevation of one end of a tape of material which is weakened, when coming into contact with one of the chemical substances, and there is also shown the manner of attaching a cord.

Figure 5 is a perspective view of a beveled binding button, which holds one end of the tape upon the box of the device.

In the figures, an earthen jar 1 is shown as a container, of a form, easily lending itself as a support for the other parts of the apparatus. Removably resting upon the rim 2 of the jar 1, is a box 3, here shown as made of thin wooden boards, which have previously been soaked in hot paraffine, and afterward coated with an acid resisting varnish. The box 3 has a top 4, from which depend, in fixed relation, the sides 5, and the ends 6 and 7. The sides 5 have projections 8, which rest directly upon the rim 2. The width of the sides 5 is such as to loosely fit against the inner wall of the jar 1, to centrally position the box therein. Each side 5 has a depending portion 9, through which passes a pin 10, journaled therein. A drop door or releasable base 11 is fixed by fasteners 12 to the pin 10, and has ears 13, which bear against the lower edges of the sides 5. The width of the door 11, between its edges, 14, is such as to permit it to freely swing, with the pin 10, between the sides 5, although limited in its upward turn by the ears 13. A spring 15 is provided, having its coils around the pin 10, and its ends bearing respectively against the box end 6 and the door 11, to forcibly drop and hold the same wide open.

Upon the outside of the box end 6, is pivotally fastened the button 16, pivoted at A. This button 16 has a beveled outer end 17, which swings to bear against a looped wire or staple 18, narrowly spaced from the outer surface of the end piece 6. Attached to the door 11, is a flexible cord 19, which passes through a hole 20, the edges of which are chamfered and the surface made smooth, so that the cord 19 can freely reciprocate therethrough. The other end of the cord 19 is looped at 21, which loop is passed through the hole 22 and around the tape 23, engaging the shoulders 24. This form of attachment is quickly made. This tape 23 passes down from the cord 19 and engages a notch 25, in the extended box end 7, at its lower part. The end 7 is made long enough to come close to the bottom of the jar 1, to hold part of the tape 23 immersed in the acid, which is in the bottom of the jar, as one of the chemical substances used to produce the fumigating gas. From the notch 25, the tape 23 is brought up, threaded around the wire loop or staple 18, and then pulled tight and brought down on itself, where it is held folded by the beveled end 17, of the button 16, being swung over it. Which device forms a quickly operated and positive attachment for the tape 23. Within the box 3, is shown a bag 26, made of thin paper, or such material which will permit the easy access of one of the chemical substances to the other within the bag, when the bag drops therein. A hole 27 is provided in the top 4 for the exit of any gas which might otherwise be confined within the box 3.

In operation, the box 3, while removed from the jar 1, is set for action. Proper quantities of the two chemical substances, which are to produce the desired volume of gas by their union, are placed in the jar 1 and the box 3, respectively. That placed in the jar 1 is usually a diluted acid, while that placed in the box 3, may be in powdered form contained in a bag 26, or may be in solid form without using the bag. After placing one chemical substance in the box 3, the door 11 is closed up against the spring 15, and held there by means of the string 9 and the tape 23, held by the button 16, as shown in Figure 2, but is not placed within the jar 1, until the operator is about to set the device to operate at a subsequent time. The tape used, is of such a material and of such a thickness, as to require a fixed or nearly fixed time in which to have its strength destroyed in the acid.

When the operator has selected a position within a mill or room to be fumigated, such a position as he thinks best to have the gas flow from, he places the jar, and when he is ready to set the apparatus, he puts the prepared box 3 into the jar, suspending it therein, and leaves the spot. With the acid at the level B, and the parts set as shown in full lines, in Figure 2, the tape 23 will, after a time, become so weakened by the acid, as to permit the spring 15, with the weight of the bag 26, to draw the cord 9 through the hole 20, at the instant the tape 23 breaks under the strain while in its weakened condition, and the parts will take the dotted positions shown; the drop door 11, the position 11ª; the tape 23, the position 23ª; the cord 19, the position 19ª; and the bag 26, the position 26ª, where it has dropped into the acid.

On account of the rectangular shape of the box 3, and the circular shape of the jar 1, plenty of open space for the exit of the gas from the jar is provided. Tapes of various thicknesses can be provided and have printed thereon the time it takes for the acid, of the dilution used in the operation, to destroy the strength of the tape, so that the operator can select the proper timed tape, when preparing his devices. If he uses the deadly hydro-cyanic acid gas for fumigation, he might find it well to have the tapes vary as to the time it takes them to weaken to the breaking point in the acid solution of the different jars, assuming that this solution is equally strong, in its weakening action, for the different jars. He can then, in his round of placing the jars, set those jars first, which take the longer time for the tapes to rot in the solution, and thus give himself ample time to escape after setting all the jars. I have found strips of close grained paper, very serviceable as tapes in the device, using the thinner pieces for a short time operation and thicker pieces of the same material for the longer times.

Inasmuch as different forms of the essential elements of my invention can be substituted for those herein shown and described, without departing from the spirit and scope of my invention, I do not wish to be confined to the one embodiment herein illustrated and explained; therefore I claim:

1. In a device adapted to cause two chemical substances, held thereby, to automatically come together for a reaction after time has elapsed from the setting of said device, a member, normally positioned to keep the said substances apart, and means for retaining said member in its normal position, said means including a part, perishable in one of said substances, whereby, upon the breaking of said part, weakened in the said substance, said means releases its hold upon said member, freeing the same to change from its normal position, permitting said substances to come together and react, after the time required by the said portion to weaken in the said substance and break.

2. A device for causing chemical substances held thereby to come together for a reaction, comprising a container for said substances, a member normally positioned to keep the said substances apart, and means for retaining said member normally positioned, said means including a part, perishable in one of the said substances, whereby, upon the breaking of said part, weakened by the said substance, the said means releases its hold upon the said member, freeing the same to change from its normal position, to permit the said substances to come together and react.

3. A device adapted to cause two chemical substances, held thereby, to come together for a reaction, comprising a receptacle for each of said substances, a member normally positioned to hold said substances, held in said receptacles, from coming together, means for holding said member in normal position, and a part of said means perishable in one of said substances, whereby, upon the breaking of said part, weakened by the said substance, the said member changes position, permitting said substances to come together and react.

4. In a device adapted to cause two chemical substances, held thereby, to come together for a reaction, a receptacle for each of said substances, adjoining one another, and means for retaining said substances normally apart, said means including a portion perishable by contact with one of said substances, whereby, upon the breaking of said portion, after being weakened by the said substance, said substances come together and react.

5. A device for automatically bringing together two chemical substances for producing a gas, comprising a container for one of the substances, a holder for the other substance, supporting means for positioning said holder above said container, a releasable base for the said holder, adapted to support a substance within said holder, retaining means including an element perishable in the substance within said container, said retaining means being fixed at one end, and attached at the other end to said base, in a manner to support said base, to retain the substance within said holder, said retaining means being positioned to bring said element in contact with the substance within said container, whereby upon the breaking of said element, weakened by the substance in said container, said base is released to drop the substance from said holder, upon the substance in said container, to react and generate a gas.

6. A device comprising a supporting receptacle, a holder removably mounted upon said supporting receptacle, a releasable bottom to said holder, an extension on said holder, reaching down within said supporting receptacle to be in contact with a substance, when held within said supporting receptacle, retaining means for releasably supporting said releasable bottom, said retaining means including an element perishable in a substance contained by said supporting receptacle, said element being positioned by said extension to come into contact with a substance held by said receptacle, whereby upon the destruction of the holding quality of said element by contact with the substance held by said receptacle, said bottom is released to drop a substance held thereby, to come into contact with the substance held in said receptacle.

7. A device adapted to cause two chemical substances, held thereby, to come together for a reaction, comprising a receptacle for each of said substances, a member normally positioned to hold said substances, held in said receptacles, from coming together, a second member for forcibly moving said first mentioned member from its normal position when released, means for holding said first mentioned member in normal position a part of said means being perishable in one of said substances, and other means for holding said part in contact with the perishing substance, whereby, upon the breaking of said part, weakened by the said substance, the said first mentioned member is released and is forcibly moved by the said second member from its normal position, permitting said substances to come together and react.

8. A fumigating device comprising a substance container, a substance holder supported at the upper part of said container, an extension depending from said holder into said container to reach the surface of substance held by said container, a releasable bottom to said holder, means for normally holding said bottom up to support the substance held by said holder, and an element, perishable in one of said substances, said element being connected with said means and said holder and passing around the lower end of said extension to contact with the substance in said container, whereby upon the destruction of the holding power of said element said bottom is released to drop the substance from said holder onto the substance in said container, for a reaction.

9. A fumigating device comprising a substance container, a substance holder supported at the upper part of said container, an extension depending from said holder into said container to reach the surface of substance held by said container, a releasable bottom to said holder, a spring connected with said bottom to forcibly throw the same down when released, means for normally holding said bottom up to support the substance held by said holder, and an element, perishable in one of said substances, said element being connected with said means and said holder and passing around the lower end of said extension to contact with the substance in said container, whereby upon the destruction of the holding power of said element said bottom is released to drop the substance from said holder onto the substance in said container, for a reaction.

Philadelphia, Pa., Feb. 11th, 1921.

JOHN EDWARD THEBAUD.